US012566300B2

(12) United States Patent
Cassady et al.

(10) Patent No.: US 12,566,300 B2
(45) Date of Patent: Mar. 3, 2026

(54) FERRULE PROFILE IMAGING AND MEASUREMENT

(71) Applicant: VIAVI Solutions Inc., Chandler, AZ (US)

(72) Inventors: Kevin Cassady, Monroe, WA (US); Alexis Bartels-Popelar, Woodinville, WA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/442,303

(22) Filed: Feb. 15, 2024

(65) Prior Publication Data

US 2024/0184058 A1 Jun. 6, 2024

Related U.S. Application Data

(63) Continuation of application No. 17/643,971, filed on Dec. 13, 2021, now Pat. No. 11,927,811.

(51) Int. Cl.
| | |
|---|---|
| *G02B 21/06* | (2006.01) |
| *G01M 11/00* | (2006.01) |
| *G02B 6/38* | (2006.01) |
| *G02B 21/36* | (2006.01) |
| *G06T 7/60* | (2017.01) |
| *H04N 23/74* | (2023.01) |

(52) U.S. Cl.
CPC ............. *G02B 6/385* (2013.01); *G01M 11/30* (2013.01); *G02B 21/06* (2013.01); *G02B*

*21/365* (2013.01); *G06T 7/60* (2013.01); *H04N 23/74* (2023.01); *G06T 2207/10056* (2013.01)

(58) Field of Classification Search
None
See application file for complete search history.

(56) References Cited

U.S. PATENT DOCUMENTS

| | | | | |
|---|---|---|---|---|
| 5,854,852 A | * | 12/1998 | Csipkes ............... | G02B 6/3843 |
| | | | | 356/73.1 |
| 9,841,567 B1 | * | 12/2017 | Zhou ................... | G02B 26/0816 |
| 2013/0147943 A1 | * | 6/2013 | Katzir ................ | G02B 19/0014 |
| | | | | 362/244 |
| 2017/0030801 A1 | * | 2/2017 | Towfiq ................... | G02B 6/385 |
| 2023/0185030 A1 | | 6/2023 | Cassady et al. | |
| 2024/0060851 A1 | * | 2/2024 | Berg ..................... | G01M 11/31 |

* cited by examiner

*Primary Examiner* — Samuel D Fereja
(74) *Attorney, Agent, or Firm* — Harrity & Harrity, LLP

(57) ABSTRACT

In some implementations, an optical component of a microscope may capture an image of a profile of a ferrule and a connector of an optical fiber based on the ferrule being received by a first opening of a first connector adapter of the microscope. A mechanical axis of the ferrule may be orthogonal to an optical path from a camera of the microscope to the ferrule when the ferrule is received by the first opening. One or more processors associated with the microscope may process the image to determine a measurement of a chamfer of the ferrule. The optical component may capture an image of an endface of the ferrule based on the ferrule being received by a second opening of a second connector adapter. The mechanical axis of the ferrule may be axially aligned with the optical path when the ferrule is received by the second opening.

20 Claims, 13 Drawing Sheets

100 ⟶

Ferrule endface 116

Optical fiber 114

Opening 112

Ferrule 108

Ferrule chamfer 118

Body portion 110

Fiber optic connector 104

100

Camera 210

Reflected light

Beam splitter 214

Light source 212

Lens 216

Offset light source 232

Microscope 202

Interior surface 222

Connector adapter 218

Reflection at endface 226

Reflection at interior surface 222

Reflection at ferrule chamfer 224

200

300

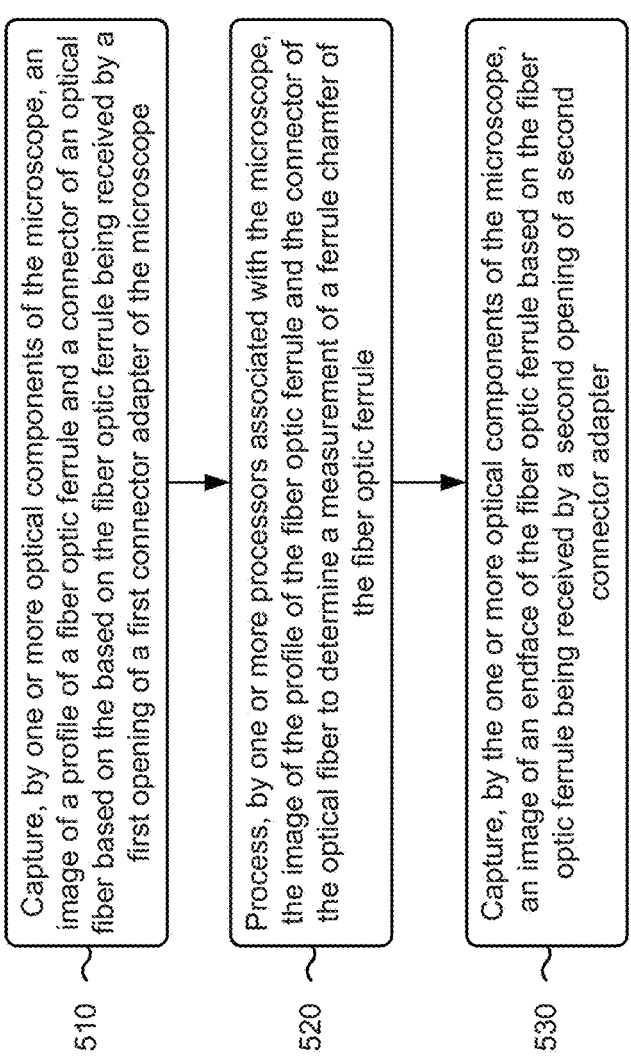

510 — Capture, by one or more optical components of the microscope, an image of a profile of a fiber optic ferrule and a connector of an optical fiber based on the based on the fiber optic ferrule being received by a first opening of a first connector adapter of the microscope 520 — Process, by one or more processors associated with the microscope, the image of the profile of the fiber optic ferrule and the connector of the optical fiber to determine a measurement of a ferrule chamfer of the fiber optic ferrule 530 — Capture, by the one or more optical components of the microscope, an image of an endface of the fiber optic ferrule based on the fiber optic ferrule being received by a second opening of a second connector adapter

FERRULE PROFILE IMAGING AND MEASUREMENT

RELATED APPLICATION

This application is a continuation of U.S. patent application Ser. No. 17/643,971, filed Dec. 13, 2021, which is incorporated herein by reference in its entirety.

BACKGROUND

A microscope, such as a video microscope, may be used to view a fiber optic connector and to determine imperfections in the fiber optic connector.

SUMMARY

In some implementations, a method includes capturing, by one or more optical components of a microscope, an image of a profile of a fiber optic ferrule and a connector of an optical fiber based on the fiber optic ferrule being received by a first opening of a first connector adapter of the microscope, wherein a mechanical axis of the fiber optic ferrule is orthogonal to an optical path from a camera of the microscope to the fiber optic ferrule when the fiber optic ferrule is received by the first opening; processing, by one or more processors associated with the microscope, the image to determine a measurement of a ferrule chamfer of the fiber optic ferrule; and capturing, by the one or more optical components of the microscope, an image of an endface of the fiber optic ferrule based on the fiber optic ferrule being received by a second opening of a second connector adapter, wherein the mechanical axis of the fiber optic ferrule is axially aligned with the optical path of the microscope when the fiber optic ferrule is received by the second opening.

In some implementations, a microscope includes a light source configured to emit light onto a ferrule of a connector of a fiber optic cable; a camera; a housing forming a shaft that provides an optical path from the camera to the ferrule; a first connector adapter that includes a first opening configured to receive the ferrule, wherein a mechanical axis of the ferrule is orthogonal to the optical path from the camera to the ferrule when the ferrule is received by the first opening; and a second connector adapter that includes a second opening configured to receive the ferrule, wherein the mechanical axis of the ferrule is axially aligned with the optical path of the microscope when the ferrule is received by the second opening, wherein the camera is configured to: capture an image of a silhouette of a profile of the ferrule based on the ferrule being received by the first opening of the first connector adapter, and capture an image of an endface of the ferrule based on the ferrule being received by the second opening of the second connector adapter.

In some implementations, a microscope includes a light source configured to emit light onto a ferrule of a connector of a fiber optic cable; a camera; a first connector adapter that includes a first opening configured to receive the ferrule, wherein a mechanical axis of the ferrule is orthogonal to an optical path from the camera to the ferrule when the ferrule is received by the first opening; and a second connector adapter that includes a second opening configured to receive the ferrule, wherein the mechanical axis of the ferrule is axially aligned with the optical path of the microscope when the ferrule is received by the second opening, wherein the camera is configured to: capture an image of a silhouette of a profile of the ferrule based on the ferrule being received by the first opening of the first connector adapter, and capture an image of an endface of the ferrule based on the ferrule being received by the second opening of the second connector adapter; and one or more processors, communicatively coupled to one or more memories, configured to: receive the image of the profile of the ferrule and the connector based on the ferrule being received by the first opening; and process the image to determine a measurement of a ferrule chamfer of the ferrule.

BRIEF DESCRIPTION OF THE DRAWINGS

FIG. 5 is a flowchart of an example process relating to ferrule profile imaging and measurement.

DETAILED DESCRIPTION

Figure 1A:
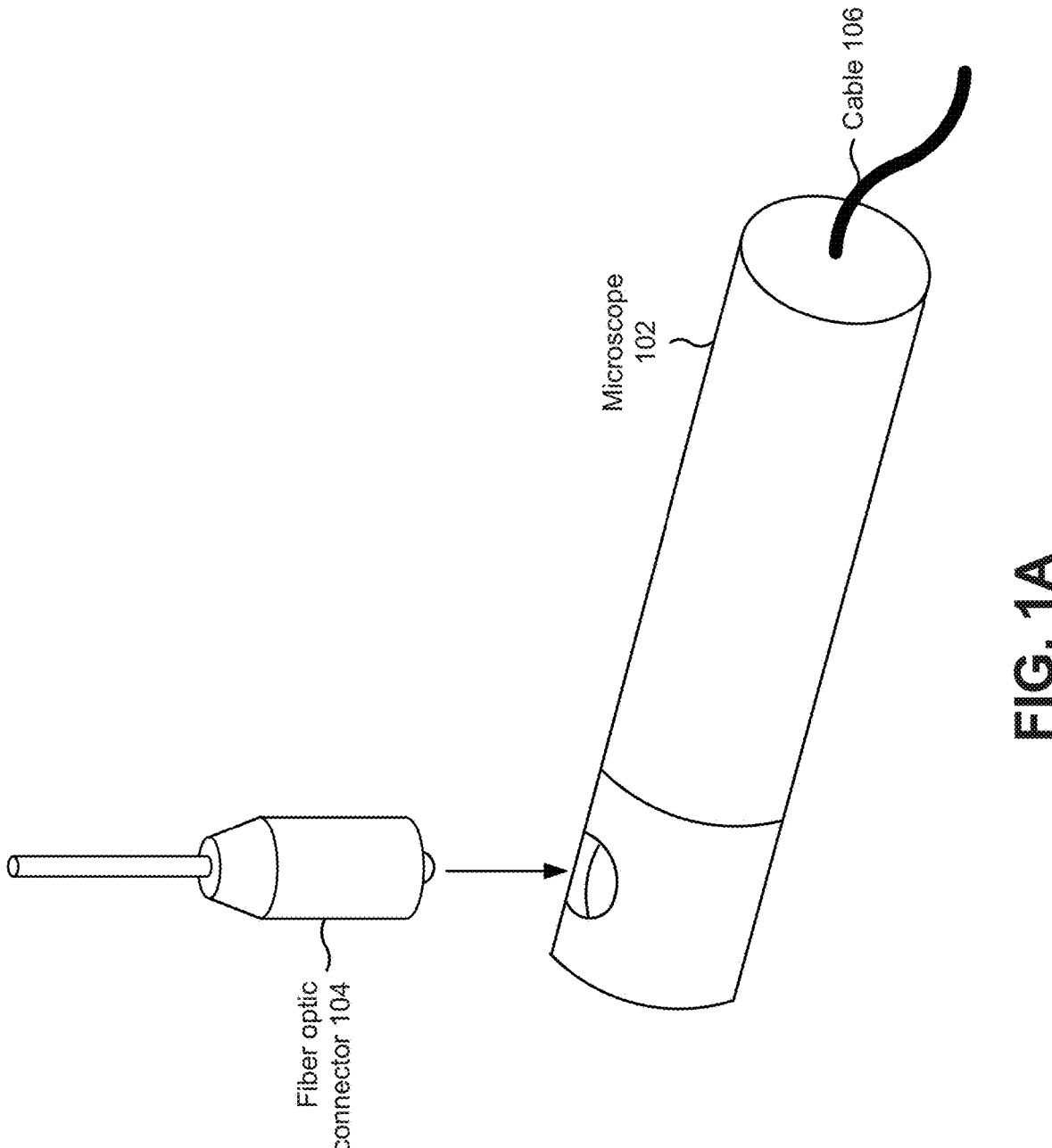
FIGS. 1A-1F are diagrams of an example implementation of a microscope for ferrule profile imaging and measurement, according to some implementations described herein.

The following detailed description of example implementations refers to the accompanying drawings. The same reference numbers in different drawings may identify the same or similar elements.

A fiber optic connector may include a connector body that retains a cylindrical ceramic ferrule. The ferrule includes a small bore through a central axis that supports a piece of optical fiber. A flexible jacket may house the optical fiber that exits the fiber optic connector. The optical fiber is fixed in place in the bore, and the optical fiber and an endface of the ferrule are polished to a smooth finish. Typically, a chamfer or a bevel is added at a circular edge formed between the endface and a cylindrical face of the ferrule. The chamfer protects the edge from damage and facilitates insertion into mating adapters.

A microscope may use illumination to illuminate surfaces of the ferrule. Light emitted from a light source of the microscope reflects from a beam splitter (e.g., half of the light reflects, and half of the light passes through). The light reflected from the beam splitter passes through a lens of the microscope and reflects from the ferrule endface and the optical fiber. The reflected light passes back through the lens and forms an image of the ferrule endface at a camera of the microscope.

Commonly, the chamfer between the endface and the cylindrical face of the ferrule is manufactured at various angles (e.g., a chamfer angle) by different manufacturers. Knowledge of the chamfer angle may be required to properly configure the microscope to image the chamfer region and/or to inspect the chamfer region for defects. Further, a mating adapter utilized to connect two optical fibers may be configured to accept a ferrule having a particular chamfer angle. Thus, it may be necessary to determine a chamfer angle to ensure that a properly configured mating adapter is utilized to connect the optical fiber to another optical fiber. However, the fiber optic ferrule is typically positioned coaxial to the microscope's optical axis to produce an image of the endface, which may prevent the chamfer angle from being imaged and/or measured.

Some implementations described herein are directed to a microscope that enables a chamfer angle to be imaged and measured while also enabling the ferrule to be inspected for defects. In some implementations, the microscope is configured to position a mechanical axis of the ferrule orthogonal relative to an optical axis of the microscope. By positioning the mechanical axis of the ferrule orthogonal relative to the optical axis of the microscope, a camera of the microscope is able to obtain an image depicting a sharp silhouette of a geometry of the ferrule. In some implementations, the microscope includes a highly reflective interior surface positioned beyond the plane of the ferrule, which may further enhance the contrast of the image of the silhouette of the geometry of the ferrule.

In some implementations, the image of the silhouette of the geometry of the ferrule may be provided to a processing unit associated with the microscope. The processing unit may process the image to determine one or more measurements of the chamfer, such as a chamfer angle and/or a length of the chamfer, among other examples.

In some implementations, the microscope may also be configured to position the mechanical axis of the ferrule coaxial to the optical axis of the microscope. The microscope may include a reflective interior surface that reflects light emitted by a light source onto a chamfer region (e.g., the chamfer and/or a portion of a connector associated with the ferrule). The light from the light source is reflected by the reflective interior surface onto the chamfer region at an angle that causes the reflected light to be reflected from the chamfer region and to pass back through a lens of the camera to enable the camera to generate an image of features of the chamfer region and/or contamination on the chamfer region. In some implementations, the one or more measurements of the chamfer may be used to determine a shape of the reflective interior surface that enables the light from the light source to be reflected by the reflective interior surface onto the chamfer region at an angle that causes the reflected light to be reflected from the chamfer region and to pass back through the lens of the camera. In some implementations, the processing unit compares the determined shape of the reflective interior surface and an actual shape of the reflective interior surface of the microscope. The processing unit may provide an output indicating whether the determined shape of the reflective interior surface is substantially the same as (e.g., within a threshold difference) the actual shape of the reflective interior surface of the microscope.

FIGS. 1A-1F are diagrams of an example implementation 100 of a microscope for ferrule profile imaging and measurement, according to some implementations described herein. As shown in FIGS. 1A-1F, example implementation 100 includes a microscope 102 and a fiber optic connector 104. The microscope 102 may include an optical microscope with or without a display, a video microscope used to view the fiber optic connector 104 and to determine imperfections in the fiber optic connector 104, and/or the like. The fiber optic connector 104 may include any fiber optic connector that includes an optical fiber, such as a fiber-optic connector (FC), an FC/physical content (PC) connector, an FC/angled physical content (APC) connector, a snap-in connector (SC), a straight tip (ST) connector, and/or a small-form factor (LC) connector, among other examples. Further details of the microscope 102 and the fiber optic connector 104 are provided elsewhere herein.

As shown in FIG. 1A, the fiber optic connector 104 may be connected to the microscope 102. For example, the fiber optic connector 104 may be inserted into the microscope 102 so that the fiber optic connector 104 may be retained in and tested by the microscope 102. The fiber optic connector 104 may be retained the microscope 102 via a friction-based connection or a locking-based connection, among other examples. Further details of the interconnection of the fiber optic connector 104 and the microscope 102 are provided elsewhere herein. As further shown in FIG. 1A, a cable 106 may connect to the microscope 102 and may enable communication between the microscope 102 and other devices (e.g., a standalone computing device, a cloud-based device, and/or a server device, among other examples).

Figure 1B:
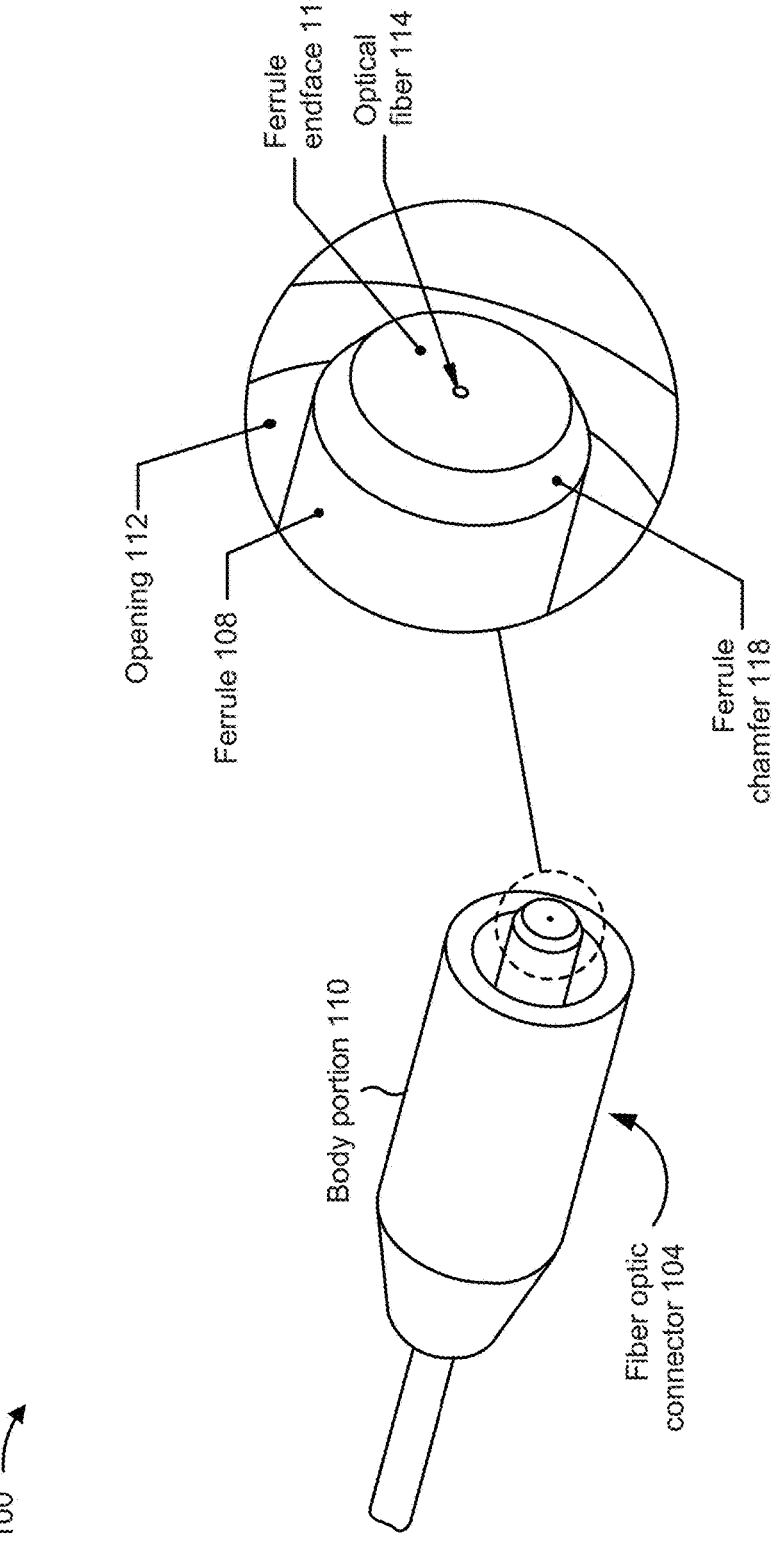

As shown in FIG. 1B, the fiber optic connector 104 may include a ferrule 108 that extends through a body portion 110 of the fiber optic connector 104 and outward away from an opening 112 of the body portion 110. The ferrule 108 may be cylindrical, square, and/or rectangular, among other examples, in shape and may be made from a variety of materials, such as plastic, stainless steel, and/or ceramic. The ferrule 108 may be sized and shaped based on an application of the fiber optic connector 104 (e.g., based on a size and shape associated with a mating fiber optic adapter). The ferrule 108 may include a bore through a central axis that includes an optical fiber 114. The optical fiber 114 may be fixed in place in the bore. The ferrule 108 may include a ferrule endface 116. The optical fiber 114 and the ferrule endface 116 may be polished to a smooth finish (e.g., a surface with less than a threshold roughness). The ferrule 108 may include a ferrule chamfer 118. The ferrule chamfer 118 may be provided at an edge of the ferrule endface 116. The ferrule chamfer 118 may extend at an angle between the edge of the ferrule endface 116 and an outer surface of the body portion 110 of the ferrule 108 to form a sloped surface relative to the surface of the ferrule endface 116. The ferrule chamfer 118 may protect the edge of the ferrule endface 116 from damage and may facilitate insertion into mating fiber optic adapters.

Figure 1C:
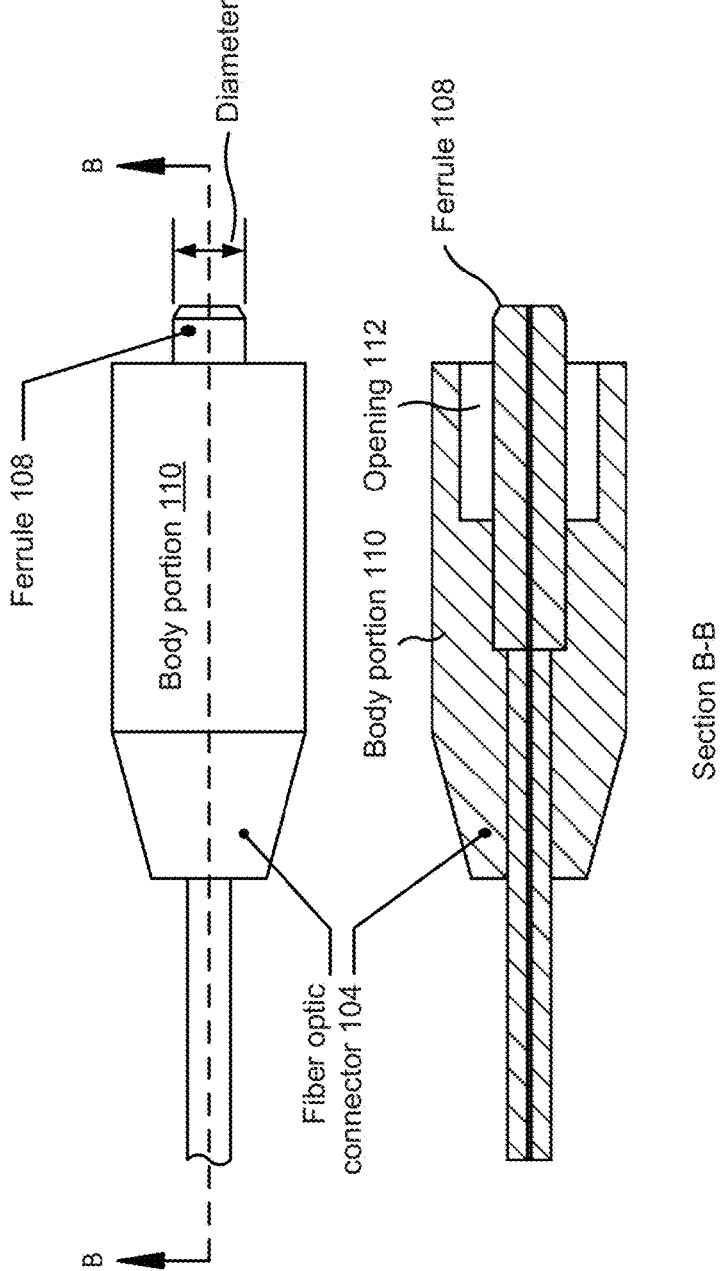

A side view of the fiber optic connector 104 is shown in the top part of FIG. 1C and a sectional view of the fiber optic connector 104, taken along line B-B of the side view, is shown in the bottom part of FIG. 1C. As shown in the side view, the ferrule 108 may include a diameter that is based on an application of the fiber optic connector 104. For example, the diameter may range from approximately one millimeter (1 mm) to approximately three millimeters (3 mm). As shown in the sectional view, the ferrule 108 may extend from within the body portion of fiber the optic connector 104, through the opening of the fiber optic connector 104, and away from the body portion and the opening.

Figure 1D:
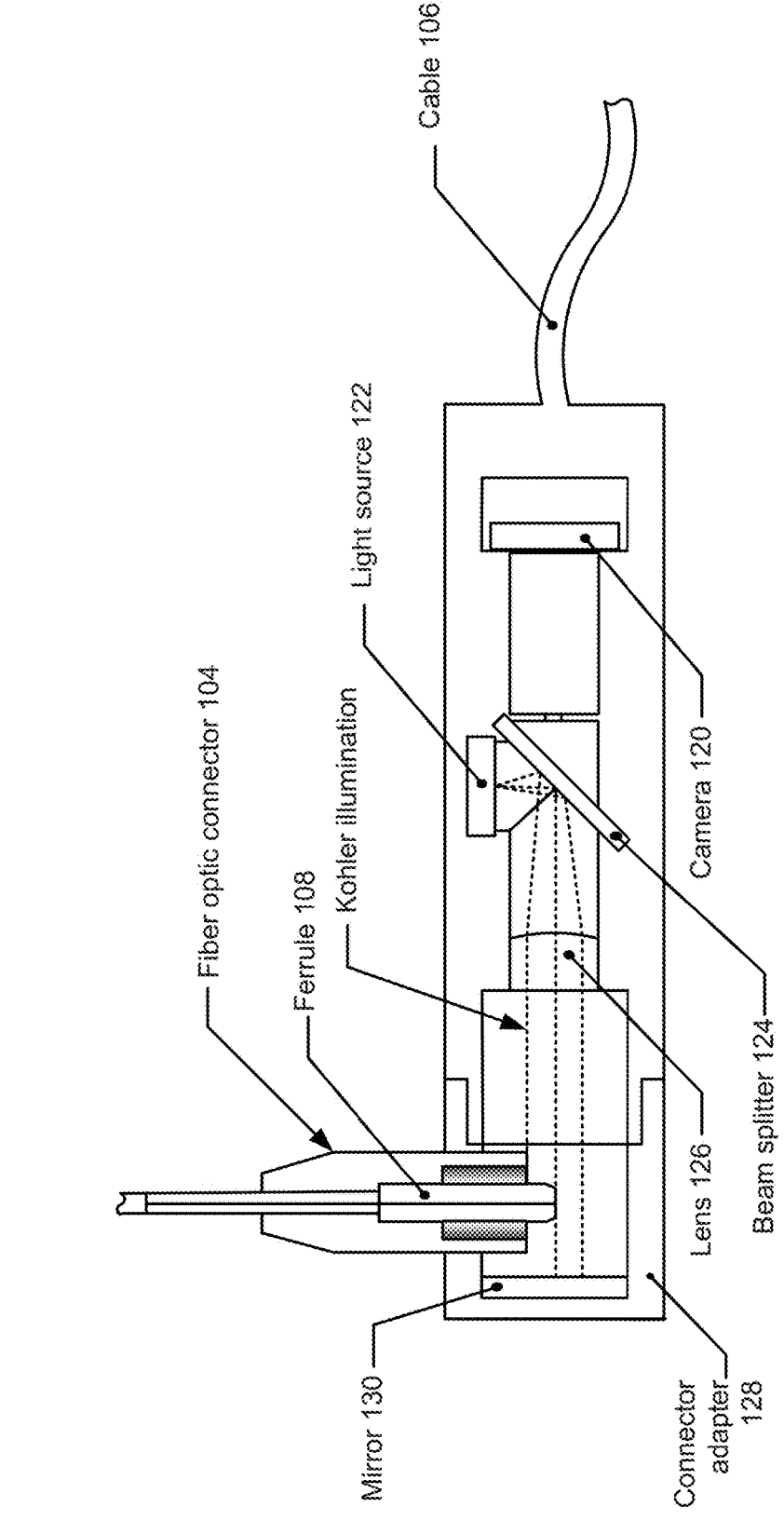

As shown in FIG. 1D, the microscope 102 may include a camera 120, a light source 122, a beam splitter 124, a lens 126, and a connector adapter 128. The camera 120 may include an image sensor that captures images based on reflected light. For example, the camera 120 may include a complementary metal-oxide-semiconductor (CMOS) mega-pixel image sensor. The light source 122 may include a light-emitting diode (LED) light source, an incandescent light source, a fluorescent light source, or a halogen light source, among other examples, that generates light. The beam splitter 124 may include an optical device that splits a beam of light into two or more beams of light. For example, the beam splitter 124 may include two triangular glass prisms that are joined together to form a cube, such that half of light incident on one face of the cube is reflected and another half of the light is transmitted due to frustrated total internal reflection.

The connector adapter 128 may be sized and shaped to fit within and connect to an end portion of the microscope 102 (e.g., an end portion that is opposite of an end portion associated with the camera 120). The connector adapter 128 may be formed from a variety of materials (e.g., metal, plastic, and/or glass, among other examples), and may include one or more openings. An opening of the connector adapter 128 may be sized and shaped to receive and retain the ferrule 108 of the fiber optic connector 104 in a particular position relative to the optical axis of the microscope, as described in greater detail below.

In some implementations, as shown in FIG. 1D, the connector adaptor 128 includes a first opening associated with generating an image of a profile of a silhouette of the geometry of the ferrule 108. As shown in FIG. 1D, the first opening is formed in a side portion of the connector adaptor 128. When received by the opening of the connector adaptor 128, a mechanical axis of the ferrule 108 (e.g., the bore provided through the ferrule 108 and including the optical fiber 114) may be positioned substantially orthogonal to the optical axis of the microscope 102.

In some implementations, the connector adapter 128 may include a second opening that is axially aligned with the optical axis of the microscope 102. The second opening may enable the microscope (e.g., the camera 120) to capture an image of the ferrule endface 118, in a manner similar to that described below with respect to FIGS. 2A-2D.

In some implementations, the connector adapter 128 may include a reflective interior surface 130 (e.g., a mirror, as shown in FIG. 1D) provided adjacent to the first opening of the connector adapter 128. In some implementations, as shown in FIG. 1D, the reflective interior surface 130 may be positioned beyond a plane of the ferrule 108 to enable the camera 120 to capture an image depicting a silhouette of the ferrule 108, as described in greater detail elsewhere herein.

A size and a shape of the reflective interior surface 130 may depend on a size and a shape of the ferrule 108, a size and a shape of the ferrule chamfer 118, and/or the microscopy lighting technique to be provided by the microscope 102. The reflective interior surface 130 may be formed from a variety of materials, such as a polished metal, a coated glass, and/or a metallized plastic, among other examples. In some implementations, the connector adapter 128 may be removable and replaceable with other connector adapters (e.g., connector adapter 218, described below with respect to FIGS. 2A-2D) that include different shaped and/or sized reflective interior surfaces that are configured for different shaped and/or sized ferrule chamfers.

In some implementations, the microscope 102 may utilize a single light source (e.g., the light source 122) to provide microscopy lighting techniques that illuminate surfaces of the ferrule 108. In some implementations, as shown in FIG. 1D, the microscope 102 may utilize Kohler illumination to provide even, uniform illumination of the ferrule 108. As further shown in FIG. 1D, a portion of the light emitted from the light source 122 of the microscope 102 reflects from the beam splitter 124 toward the lens 126.

Figure 1E:
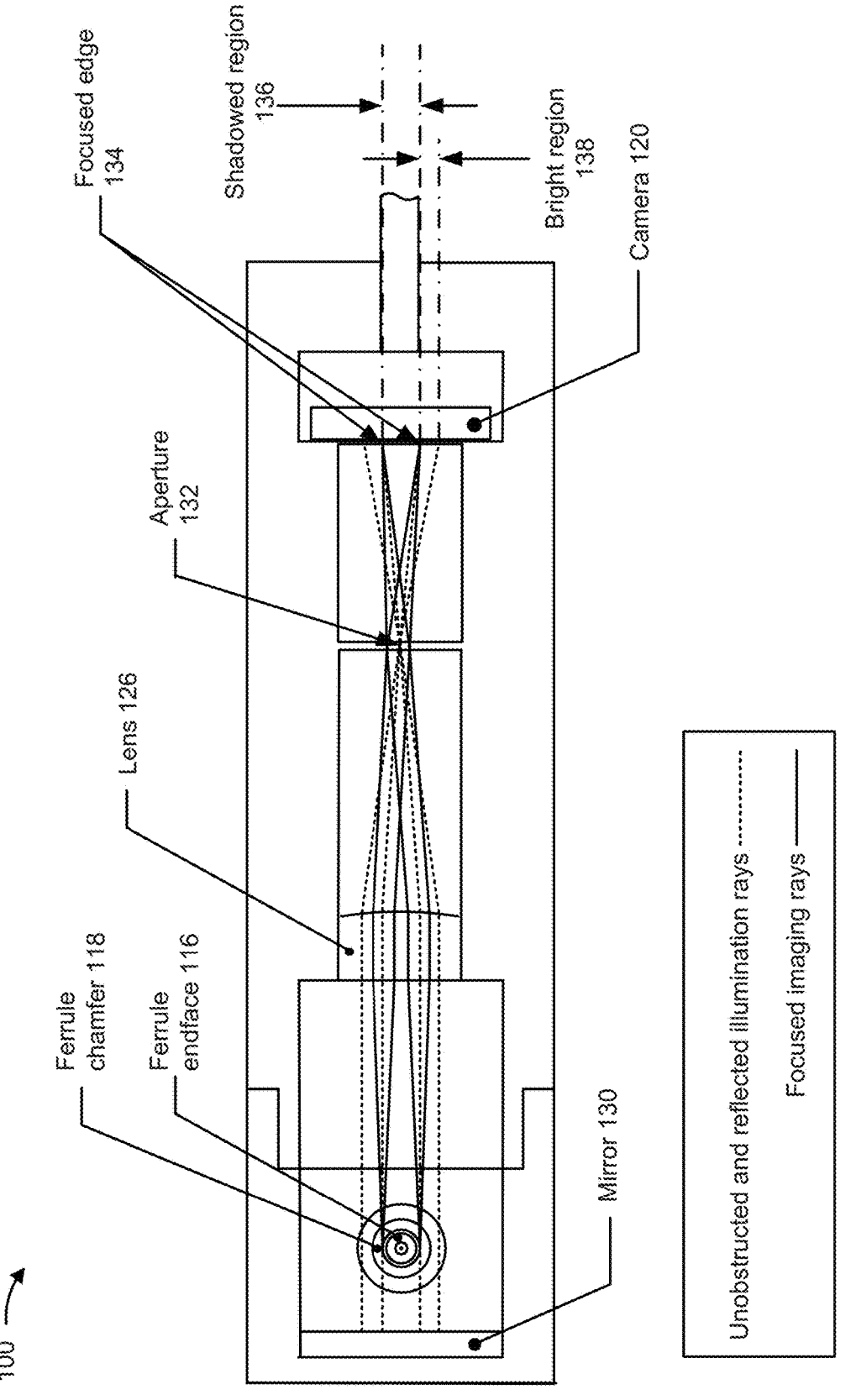

As shown in FIGS. 1D and 1E, a first portion of the light reflected from the beam splitter 124 passes through the lens 126 of the microscope 102 and is obstructed by a chamfer region (e.g., the ferrule chamfer 118 and a portion of the fiber optic connector 104) of the ferrule 108. A second portion of the light reflected from the beam splitter 124 passes through the lens 126 and reflects from the reflective interior surface 130 as unobstructed and reflected illumination rays (shown as dotted lines in FIG. 1E). In some implementations, the ferrule 108 (e.g., the chamfer region) may not adequately reflect light and, therefore, may not adequately reflect the first portion of the light back through the lens. Based on the ferrule 108 not adequately reflecting the first portion of the light back through the lens and the second portion of the light being reflected from the reflective interior surface 130 as unobstructed and reflected illumination rays, the ferrule 108 may be depicted as a dark or shadowed region corresponding to a profile of the silhouette of the ferrule 108 in the image generated by the camera 120, as described in greater detail below.

In some implementations, as shown in FIG. 1E, the imaging rays and the illumination rays pass back through the lens 126 and an aperture 132. The aperture 132 may be positioned to enable telecentric imaging of the ferrule 108. The telecentric imaging may ensure that magnification is constant throughout the field of view by forcing the chief rays to be parallel to the optical axis, which may enable one or more measurements of the ferrule chamfer 118 to be determined by the processing unit based on the image of the profile of the silhouette of the chamfer region. In some implementations, as shown in FIG. 1E, the silhouette of the profile of the chamfer region includes a shadowed region 136 corresponding to the first portion of the light not being adequately reflected by the chamfer region and a bright region 138 corresponding to the second portion of the light reflected by the reflective interior surface 130 as unobstructed and reflected illumination rays. In some implementations, the shadowed region 136 may be formed between the focused edges 134 and the bright region 138 may be formed outside of the focused edges 134, as described in greater detail below.

Figure 1F:
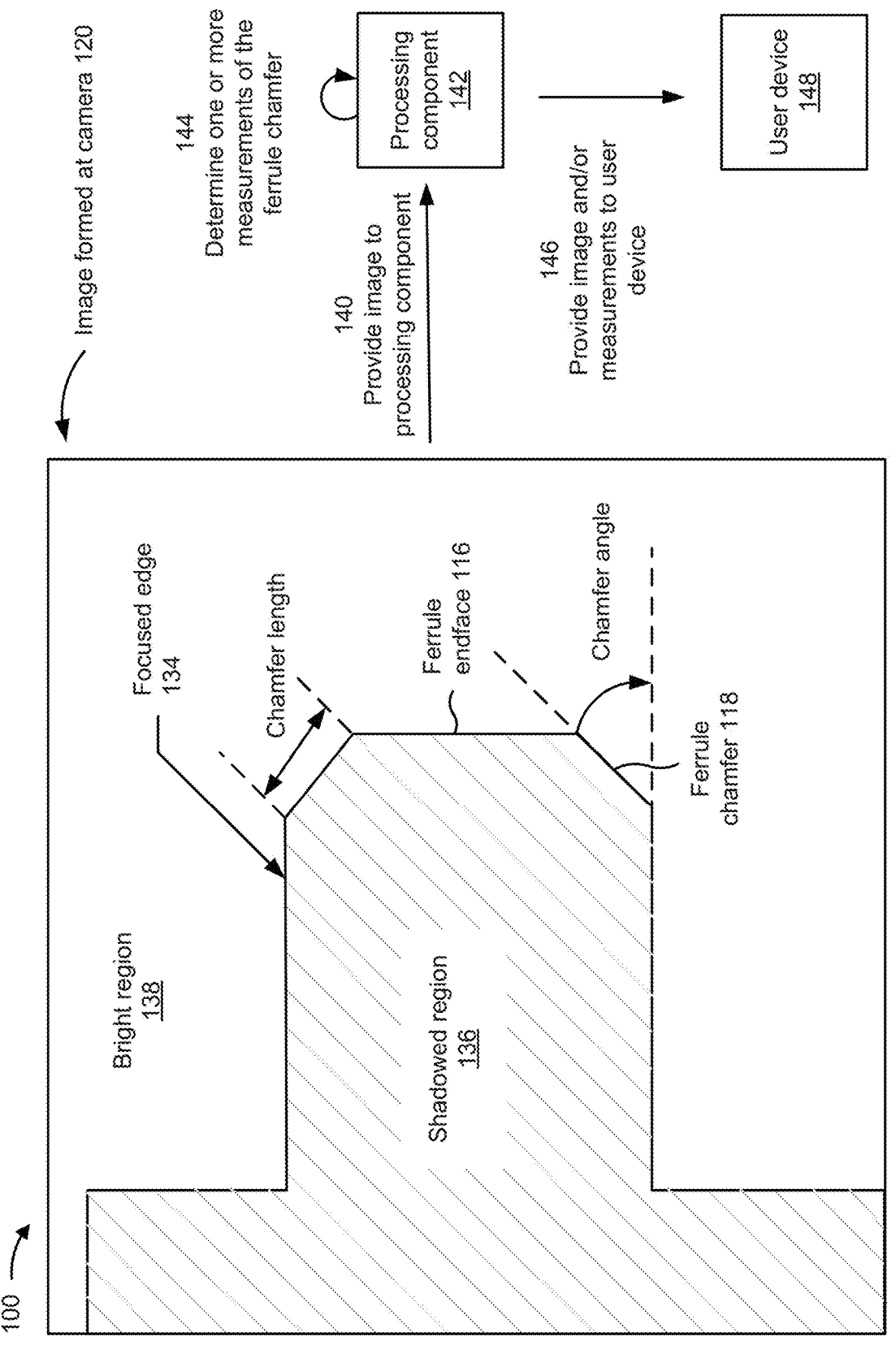

FIG. 1F illustrates an example image of the silhouette of the profile of the chamfer region generated by the camera 120. As shown in FIG. 1F, the silhouette of the profile of the chamfer region is formed by the shadowed region 136 and the bright region 138. The use of Kohler illumination and telecentric imaging may cause the image of the edges of the chamfer region to be sharply defined within the image.

As shown by reference number 140, the camera 120 may provide the image to a processing component 142. In some implementations, the processing component 142 may be included in the microscope 102. Alternatively, and/or additionally, the processing component 142 may be included in another device. For example, the processing component may be included in a computing device (e.g., a computer, a laptop, a smart phone, a server device, and/or another type of computing device configured to process the image to determine one or more measurements of the ferrule chamfer 118) and may receive the image via the cable 106 and/or one or more wired and/or wireless networks.

As shown by reference number 144, the processing component 142 may process the image to determine one or more measurements of the ferrule chamfer 118. In some implementations, the one or more measurements of the ferrule chamfer 118 may include an angle of the ferrule chamfer 118 and/or length of the ferrule chamfer 118, among other examples.

In some implementations, as shown by reference number 146, the processing component 142 may provide the image of the silhouette of the profile of the chamfer region and/or the one or more measurements to a user device 148 associated with a user of the microscope 102. The user device 148 may include a communication device and/or a computing device. For example, the user device 148 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

In some implementations, the processing component 142 may annotate the image of the silhouette of the profile of the chamfer region with the one or more measurements to generate an annotated image. The processing component 142 may provide the annotated image to the user device 148.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

FIGS. 2A-2D are diagrams of an example implementation 200 of a microscope for ferrule endface imaging and measurement, according to some implementations described herein. As shown in FIGS. 2A-2D, example implementation 200 includes a microscope 202 and a fiber optic connector 204. The microscope 202 may include an optical microscope with or without a display, a video microscope used to view the fiber optic connector 204 and to determine imperfections in the fiber optic connector 204, and/or the like. The fiber optic connector 204 may include any fiber optic connector that includes an optical fiber, such as an FC, an FC/PC connector, an FC/APC connector, an SC, an ST connector, and/or an LC connector, among other examples. Further details of the microscope 202 and the fiber optic connector 204 are provided elsewhere herein.

Figure 2A:
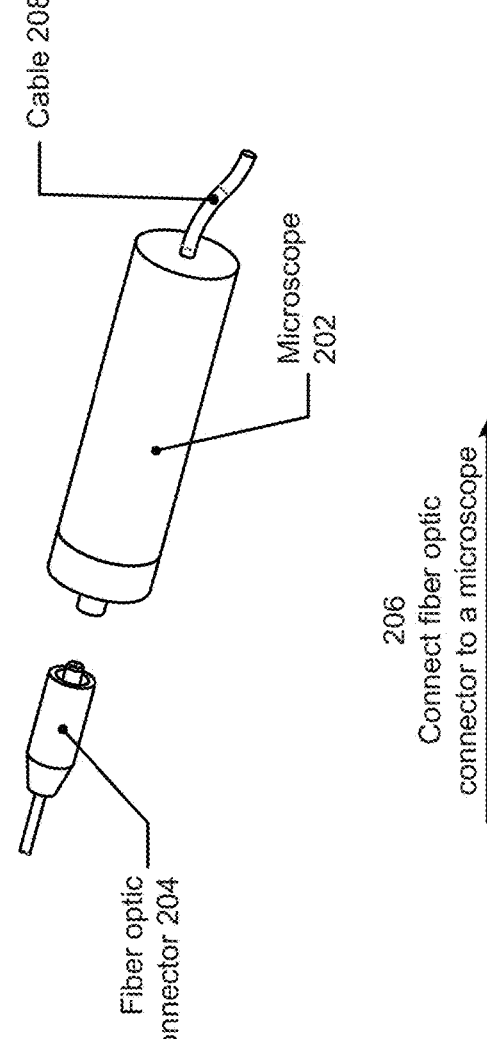
FIGS. 2A-2D are diagrams of an example implementation of a microscope for ferrule profile imaging and measurement, according to some implementations described herein.

As shown in FIG. 2A, and by reference number 206, the fiber optic connector 204 may be connected to the microscope 202. For example, the fiber optic connector 204 may be inserted into the microscope 202 so that the fiber optic connector 204 may be retained in and tested by the microscope 202. The fiber optic connector 204 may be retained in the microscope 202 via a friction-based connection or a locking-based connection, among other examples. Further details of the interconnection of the fiber optic connector 204 and the microscope 202 are provided elsewhere herein. As further shown in FIG. 2A, a cable 208 may connect to the microscope 202 and may enable communication between the microscope 202 and other devices (e.g., a standalone computing device, a cloud-based device, and/or a server device, among other examples).

In some implementations, the microscope 202 and the fiber optic connector 204 may be similar to the microscope 102 and the fiber optic connector 104, described above with respect to FIGS. 1A-1C. For example, as described above with respect to FIG. 1B and below with respect to FIG. 2B, the fiber optic connector 204 may include a ferrule that extends through a body portion of the fiber optic connector 204 and outward away from an opening of the body portion. The ferrule may be cylindrical, square, and/or rectangular, among other examples, in shape and may be made from a variety of materials, such as plastic, stainless steel, and/or ceramic. The ferrule may be sized and shaped based on an application of the fiber optic connector 204 (e.g., based on a size and shape associated with a mating fiber optic adapter). The ferrule may include a bore through a central axis that includes an optical fiber. The optical fiber may be fixed in place in the bore. The ferrule may include a ferrule endface. The optical fiber and the ferrule endface may be polished to a smooth finish (e.g., a surface with less than a threshold roughness). The ferrule may include a ferrule chamfer provided at an edge of the ferrule endface. The ferrule chamfer may extend at an angle between the edge of the ferrule endface and an outer surface of the body portion of the ferrule to form a sloped surface relative to the surface of the ferrule endface.

Figure 2B:
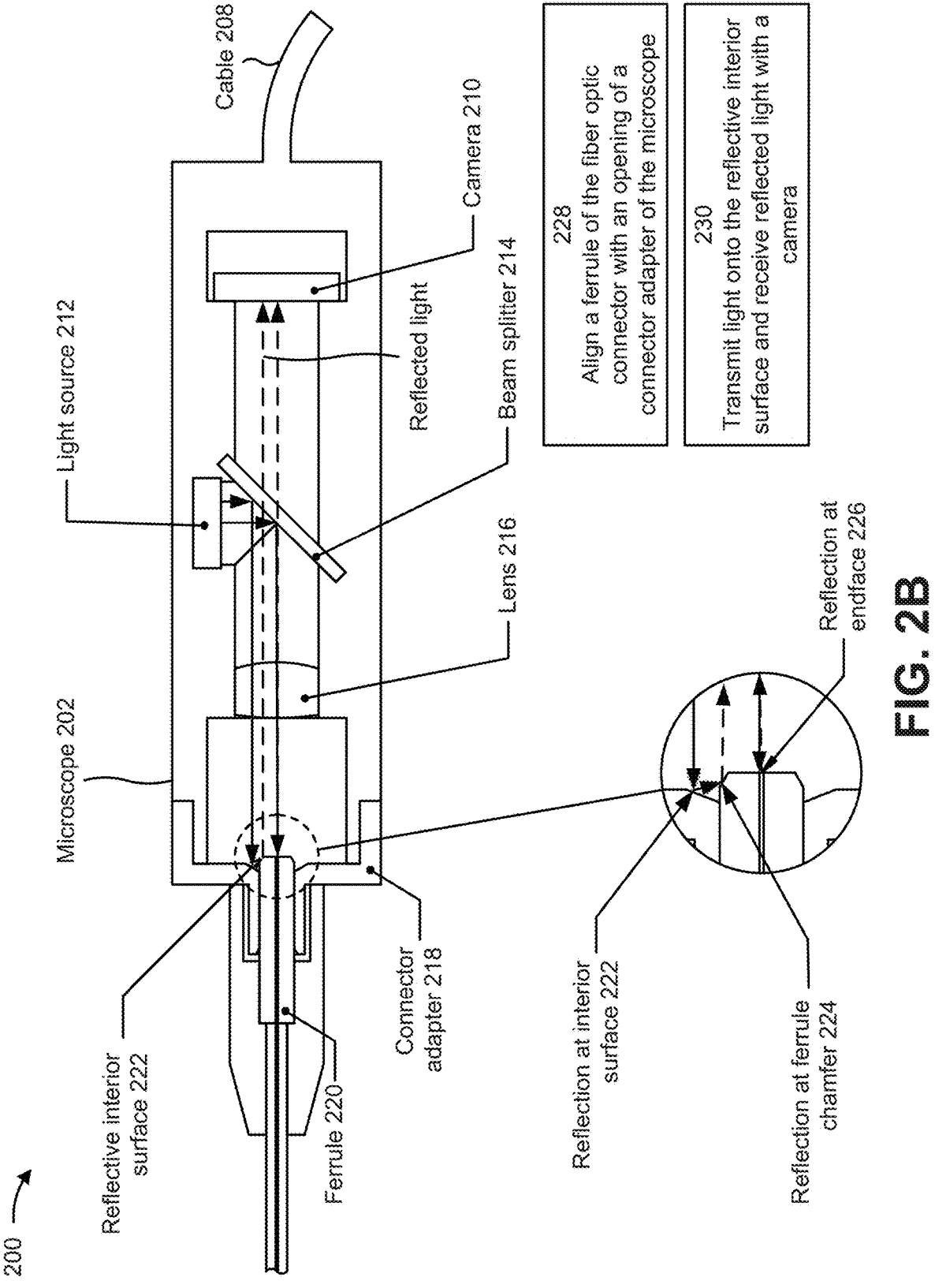

As shown in FIG. 2B, the microscope 202 may include a camera 210, a light source 212, a beam splitter 214, a lens 216, and a connector adapter 218. The camera 210 may include an image sensor that captures images based on light reflected, in a manner similar to that described above. For example, the camera 210 may include a CMOS megapixel image sensor. The light source 212 may include an LED light source, an incandescent light source, a fluorescent light source, or a halogen light source, among other examples, that generates light. The beam splitter 214 may include an optical device that splits a beam of light into two or more beams of light. For example, the beam splitter 214 may include two triangular glass prisms that are joined together to form a cube, such that half of light incident on one face of the cube is reflected and another half of the light is transmitted due to frustrated total internal reflection.

The connector adapter 218 may be sized and shaped to fit within and connect to an end portion of the microscope 202 (e.g., an end portion that is opposite of an end portion associated with the camera 210). The connector adapter 218 may be formed from a variety of materials (e.g., metal, plastic, and/or glass, among other examples), and may include one or more openings sized and shaped to receive and retain a ferrule 220 of the fiber optic connector 204.

In some implementations, the connector adapter 218 includes the first opening described above with respect to FIGS. 1A-1F. Alternatively, and/or additionally, the connector adapter 218 includes a second opening that is sized and shaped to receive and retain a ferrule 220 of the fiber optic connector 204. In some implementations, as shown in FIG. 2B, the second opening of the connector adapter 218 is axially aligned with an axis of the ferrule 220 (e.g., the bore provided through the ferrule 220) and/or the optical axis of the microscope 202 to enable the camera 210 to capture an image of a ferrule endface 226 of the ferrule 220, as described in greater detail elsewhere herein.

Figure 2C:
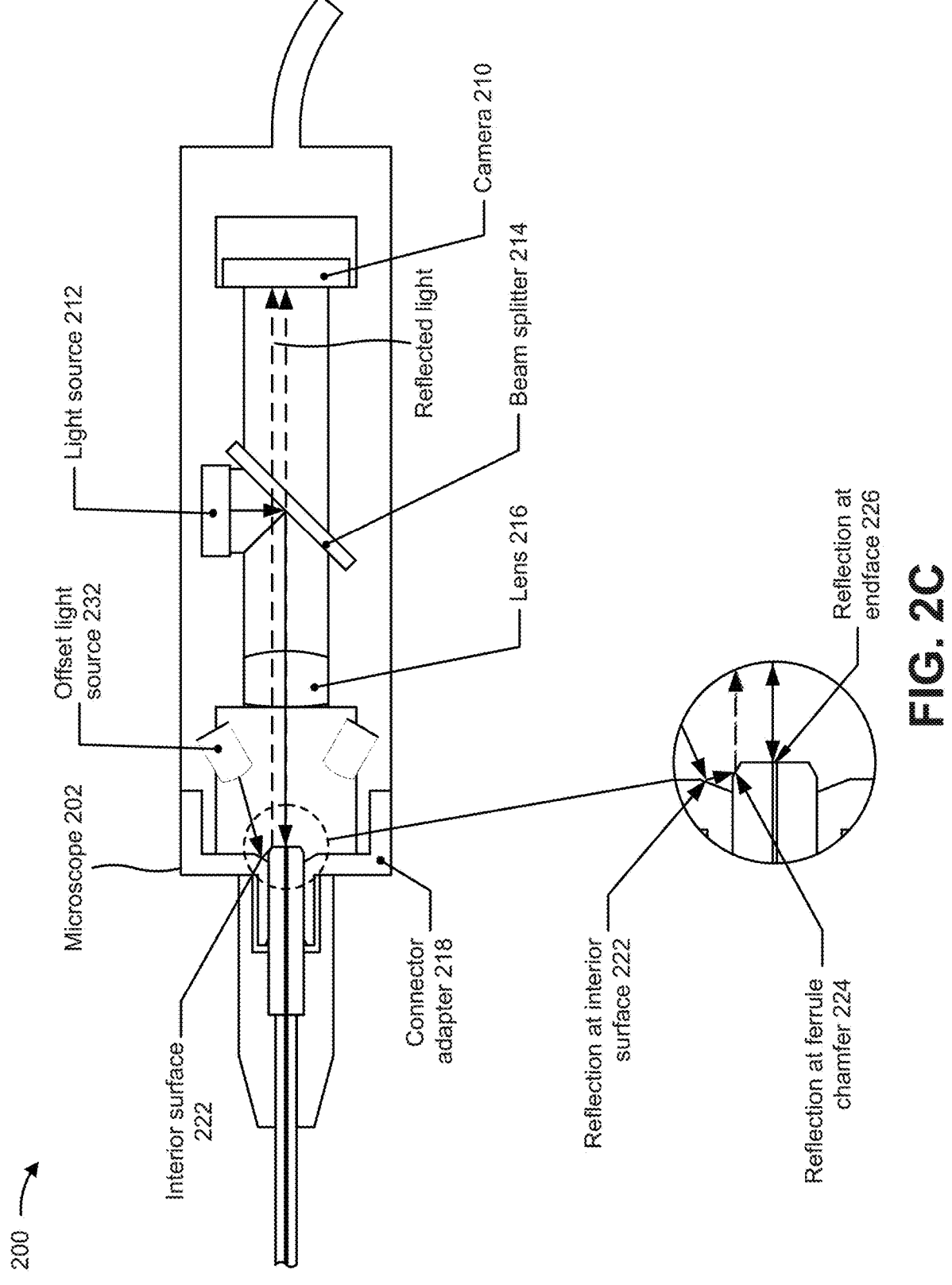

In operation, the microscope 202 may utilize a reflective interior surface 222 and a light source (e.g., the light source 212 and/or the offset light source 232, shown in FIG. 2C) to provide microscopy lighting techniques that illuminate surfaces of the ferrule 220. As shown in FIG. 2B, a portion of the light emitted from the light source 212 of the microscope 202 reflects from the beam splitter 214 toward the lens 216. The light reflected from the beam splitter 214 passes through the lens 216 of the microscope 202 and reflects from the reflective interior surface 222 onto a chamfer region (e.g., a ferrule chamfer 224 and a portion of the fiber optic connector 204) and from the chamfer region as first reflected light.

As also shown in FIG. 2B, in some implementations, a portion of the light emitted from the light source 212 of the microscope 202 reflects from the beam splitter 214 toward the lens 216. The light reflected from the beam splitter 214 passes through the lens 216 of the microscope 202 and reflects from a ferrule endface 226 of the ferrule 220 as second reflected light. The reflected light passes back through the lens 216. The camera 210 may generate an image of features of the chamfer region, contamination on the chamfer region, the ferrule endface 226, and/or contamination on the endface 226 based on the first reflected light and/or the second reflected light.

As further shown in FIG. 2B, and by reference number 228, the ferrule 220 of the fiber optic connector 204 may be aligned with and retained in the second opening of the connector adapter 218 of the microscope 202. As shown by reference number 230, and as shown in the magnified view of FIG. 2B, a portion of the light from the light source 212 may be transmitted onto the reflective interior surface 222 and may be reflected by the reflective interior surface 222 as reflected light onto the chamfer region of the ferrule 220. The reflected light may be reflected from the chamfer region and may travel through the lens 216 and the beam splitter 214 and may be received by the camera 210.

In some implementations, a portion of the light may be transmitted to the ferrule endface 226 and reflected by the ferrule endface 226 as reflected light. The reflected light from the ferrule endface 226 may travel through the lens 216 and the beam splitter 214 and may be received by the camera 210. The camera 210 may generate an image of the chamfer region and/or the ferrule endface based on the reflected light, in a manner similar to that described elsewhere herein.

As shown in FIG. 2C, in some implementations, the microscope 202 may include an offset light source 232. The light from the offset light source 232 may be transmitted to the reflective interior surface 222 and reflected onto the chamfer region of the ferrule 220. For example, and as shown in the magnified view of FIG. 2C, light from the offset light source 232 may be transmitted to the reflective interior surface 222, reflected onto the chamfer region of the ferrule 220, and reflected by the chamfer region as reflected light. The reflected light may travel through the lens 216 and the beam splitter 214 and may be received by the camera 210.

In some implementations, light from the light source 212 may be transmitted to the ferrule endface 226 and reflected by the ferrule endface 226 as reflected light. The reflected light from the ferrule endface 226 may travel through the lens 216 and the beam splitter 214 and may be received by the camera 210.

Figure 2D:
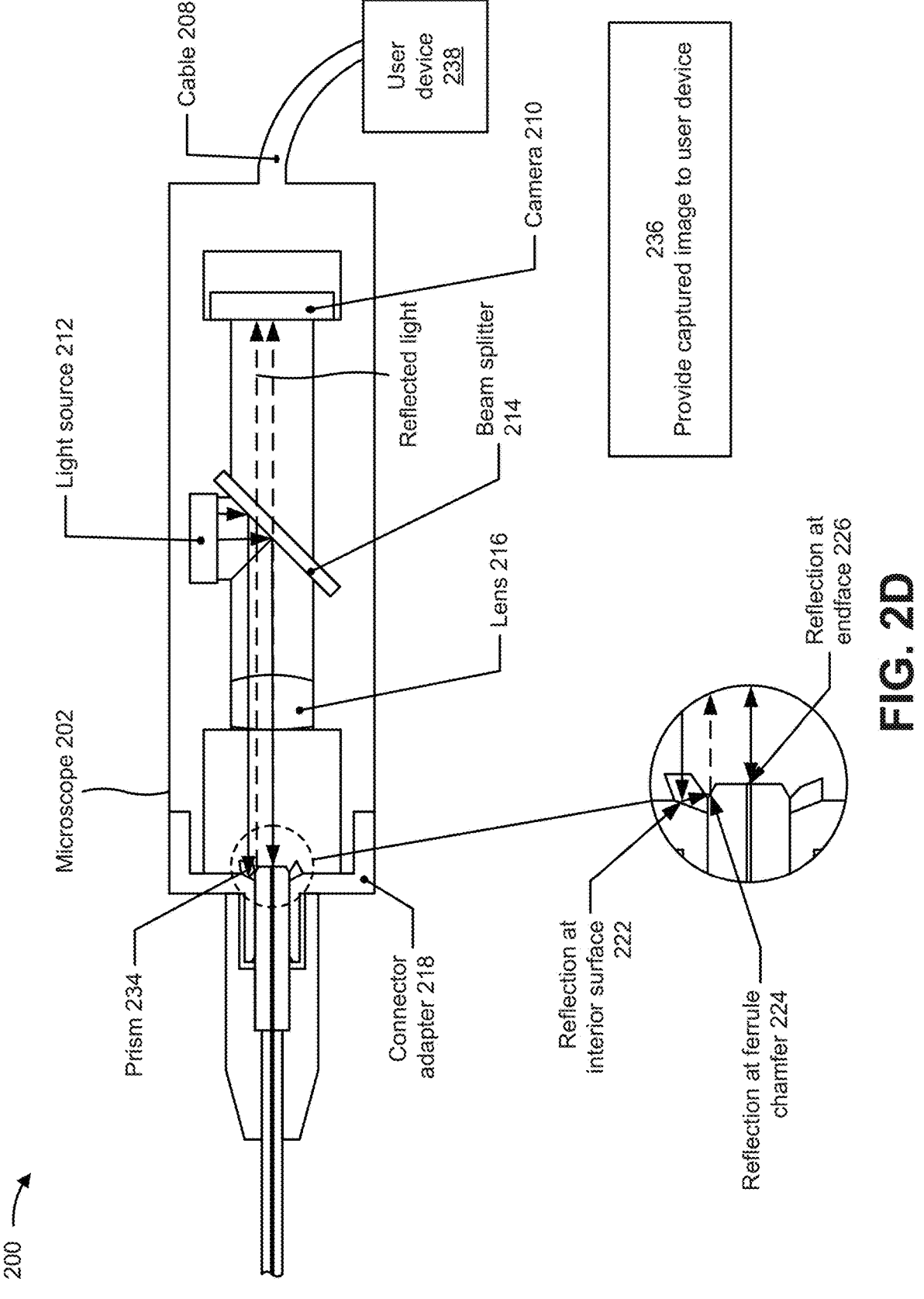

As shown in FIG. 2D, in some implementations, the microscope 202 may include a prism 234. The prism 234 may be configured to focus light from the light source 212 onto the reflective interior surface 222 to be reflected onto the chamfer region of the ferrule 220. For example, and as shown in the magnified view of FIG. 2D, light from the light source 212 may be transmitted the prism 234 and focused onto the reflective interior surface 222. The focused light may be reflected from the reflective interior surface 222 and onto the chamfer region of the ferrule 220. The light reflected onto the chamfer region may be reflected by the chamfer region as reflected light. The reflected light may travel through the lens 216 and the beam splitter 214 and may be received by the camera 210.

In some implementations, light from the light source 212 may be transmitted to the ferrule endface 226 and reflected by the ferrule endface 226 as reflected light, in a manner similar to that described above. The reflected light from the ferrule endface 226 may travel through the lens 216 and the beam splitter 214 and may be received by the camera 210.

As shown by reference number 236, the camera 210 may provide the image to a user device 238 associated with a user of the microscope 202. The user device 238 may include a communication device and/or a computing device. For example, the user device 238 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device may receive the image via the cable 208 and/or one or more wired and/or wireless networks.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
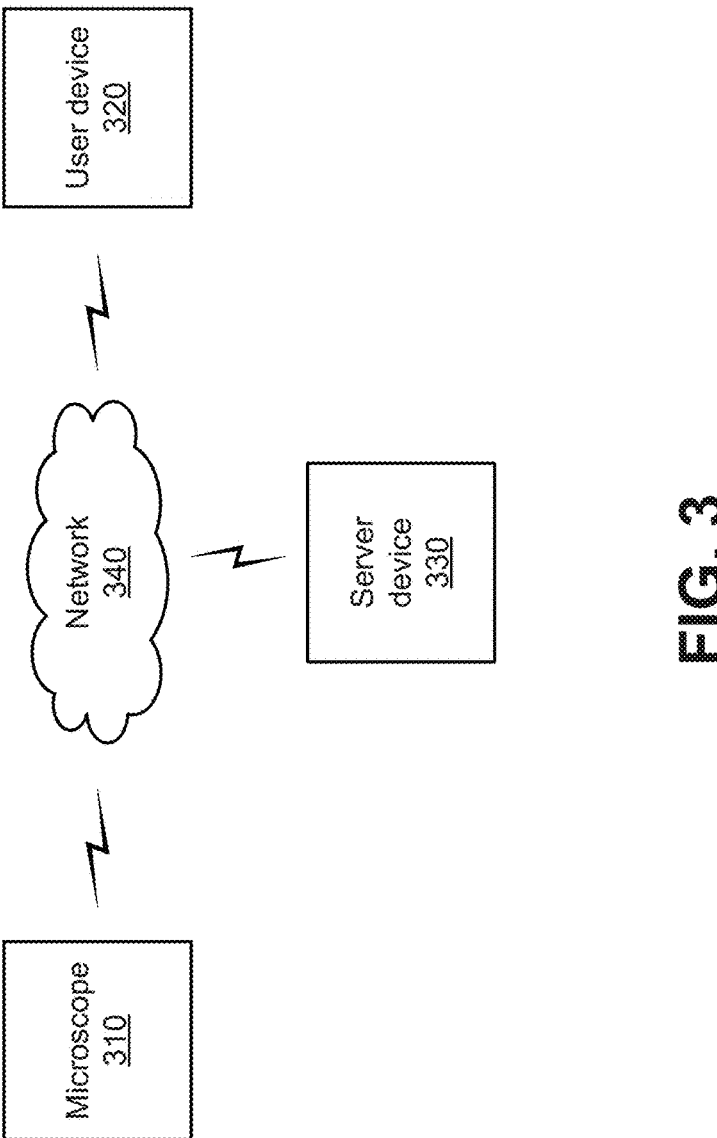
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a microscope 310, a user device 320, a server device 330, and a network 340. Devices of environment 300 may interconnect via wired connections, wireless connections, or a combination of wired and wireless connections.

The microscope 310 may include one or more components for ferrule profile imaging and measurement, as described herein. In some implementations, the microscope 310 may correspond to the microscope 102 and/or the microscope 202. For example, the microscope 310 may include an optical microscope with or without a display and/or a video microscope used to view the fiber optic connector 204 and to generate an image of a silhouette of a profile of a ferrule and/or to determine one or more measurements of a ferrule chamfer, as described herein.

The user device 320 includes one or more devices capable of receiving, generating, storing, processing, and/or providing information associated with ferrule profile imaging and measurement, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 330 includes one or more devices capable of receiving, generating, storing, processing, providing, and/or routing information associated with ferrule profile imaging and measurement, as described elsewhere herein. In some implementations, the server device 330 includes a processing component (e.g., processing component 142, processing component 238). The server device 330 (e.g., the processing component) may determine one or more measurements of a ferrule chamfer based on an image of a silhouette of a profile of a ferrule received from the microscope 310 (e.g., via network 340). The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 includes computing hardware used in a cloud computing environment.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
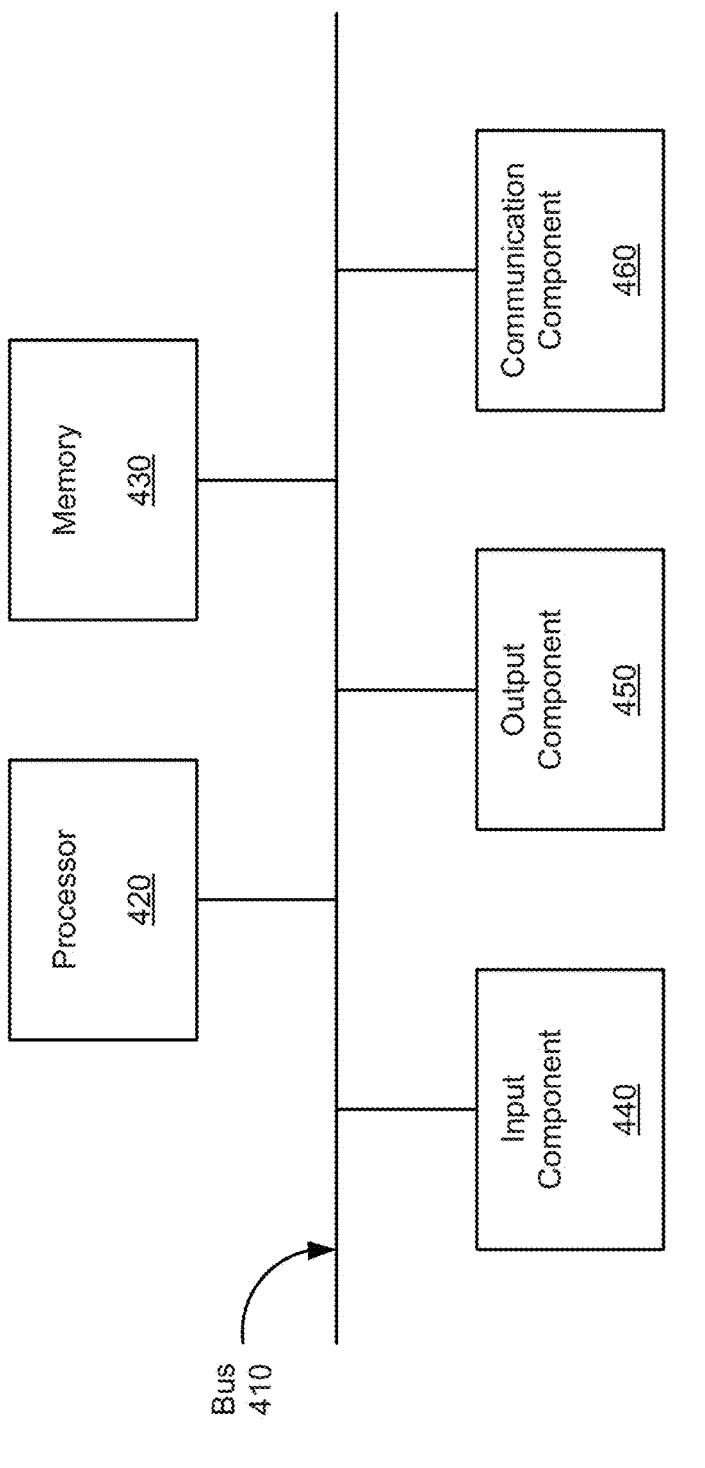
FIG. 4 is a diagram of example components of one or more devices of FIG. 3.

FIG. 4 is a diagram of example components of a device 400, which may correspond to the microscope 310, the user device 320, and/or the server device 330. In some implementations, the microscope 310, the user device 320, and/or the server device 330 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein. In some implementations, processor 420 corresponds to processing component 142 and/or processing component 238.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with ferrule profile imaging and measurement. In some implementations, one or more process blocks of FIG. 5 are performed by a microscope (e.g., microscope 310). In some implementations, one or more process blocks of FIG. 5 are performed by another device or a group of devices separate from or including the microscope, such as a user device (e.g., user device 320), a server device (e.g., server device 330), and/or a processing component (e.g., processing component 142, 238). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include capturing, by one or more optical components of a microscope, an image of a profile of a fiber optic ferrule and a connector of an optical fiber based on the fiber optic ferrule being received by a first opening of a first connector adapter of the microscope, wherein a mechanical axis of the fiber optic ferrule is orthogonal to an optical path (e.g., an optical axis) from a camera of the microscope to the fiber optic ferrule when the fiber optic ferrule is received by the first opening (block 510). For example, the one or more optical components of the microscope may capture an image of a profile of a fiber optic ferrule and a connector of an optical fiber based on the fiber optic ferrule being received by a first opening of a first connector adapter of the microscope, wherein a mechanical axis of the fiber optic ferrule is orthogonal to an optical path from a camera of the microscope to the fiber optic ferrule when the fiber optic ferrule is received by the first opening, as described above. In some implementations, the one or more optical components of the microscope may capture the image of the profile of the fiber optic ferrule and the connector of the optical fiber based on the fiber optic ferrule being received by a first opening of the connector adapter 128. In some implementations, the one or more optical components of the microscope may capture the image of the profile of the fiber optic ferrule and the connector of the optical fiber based on the fiber optic ferrule being received by a first opening of the connector adapter 218.

As further shown in FIG. 5, process 500 may include processing, by one or more processors associated with the microscope, the image to determine a measurement of a ferrule chamfer of the fiber optic ferrule (block 520). For example, one or more processors associated with the microscope may process the image to determine a measurement of a ferrule chamfer of the fiber optic ferrule, as described above. In some implementations, the microscope includes the one or more processors. Alternatively, and/or additionally, the one or more processors are external to the microscope. For example, the one or more processors may be included in a server device and/or a user device associated with the microscope and may receive the image via one or more wired and/or wireless networks.

As further shown in FIG. 5, process 500 may include capturing an image of an endface of the fiber optic ferrule based on the fiber optic ferrule being received by a second opening of a second connector adapter, wherein the mechanical axis of the ferrule is axially aligned with the optical path of the microscope when the ferrule is received by the second opening (block 530). For example, the one or more optical components of the microscope may capture an image of an endface of the fiber optic ferrule based on the fiber optic ferrule being received by a second opening of a second connector adapter, wherein the mechanical axis of the fiber optic ferrule is axially aligned with the optical path of the microscope when the fiber optic ferrule is received by the second opening, as described above.

In some implementations, the one or more optical components of the microscope may capture the image of the endface of the fiber optic ferrule based on the fiber optic ferrule being received by a second opening of the first connector adapter (e.g., the first connector adapter and the second connector adapter may be the same connector adapter). For example, after capturing the image of the profile of the fiber optic ferrule and the connector of the optical fiber and/or after determining the measurement of the ferrule chamfer, the fiber optic ferrule may be removed from the first opening of the first connector adapter and may be received by a second opening of the first connector adapter. The one or more optical components of the microscope may capture the image of the endface of the fiber optic ferrule based on the fiber optic ferrule being received by the second opening of the first connector adapter.

In some implementations, the one or more optical components of the microscope may capture the image of the endface of the fiber optic ferrule based on the fiber optic ferrule being received by an opening of another connector adapter (e.g., the first connector adapter may be different from the second connector adapter). For example, after capturing the image of the profile of the fiber optic ferrule and the connector of the optical fiber and/or after determining the measurement of the ferrule chamfer, the fiber optic ferrule may be removed from the first opening of the first connector adapter and the first connector adapter may be disconnected from the microscope. The second connector adapter may be connected to the microscope based on the first connector adapter being disconnected from the microscope. The fiber optic ferrule may be received by an opening of the second connector adapter based on the second connector adapter being connected to the microscope. The one or more optical components of the microscope may capture the image of the endface of the fiber optic ferrule based on the fiber optic ferrule being received by the opening of the second connector adapter.

Process 500 may include additional implementations, such as any single implementation or any combination of implementations described below and/or in connection with one or more other processes described elsewhere herein.

In a first implementation, the one or more processors are external to the microscope, the method further comprising providing the image of the profile of the fiber optic ferrule and the connector of the optical fiber to the one or more processors.

In a second implementation, alone or in combination with the first implementation, capturing the image of the profile of the fiber optic ferrule and the connector comprises utilizing Kohler illumination to capture the image of the profile of the fiber optic ferrule and the connector.

In a third implementation, alone or in combination with one or more of the first and second implementations, capturing the image of the profile of the fiber optic ferrule and the connector comprises utilizing telecentric imaging to capture the image of the profile of the fiber optic ferrule and the connector.

In a fourth implementation, alone or in combination with one or more of the first through third implementations, capturing the image of the profile of the fiber optic ferrule and the connector comprises capturing an image of a profile of the ferrule chamfer based on the light being reflected from an interior reflective surface of the first connector adapter.

In a fifth implementation, alone or in combination with one or more of the first through fourth implementations, processing the image to determine the measurement comprises processing the image to determine an angle of the ferrule chamfer.

In a sixth implementation, alone or in combination with one or more of the first through fifth implementations, processing the image to determine the measurement comprises processing the image to determine a length of the ferrule chamfer.

In a seventh implementation, alone or in combination with one or more of the first through sixth implementations, processing the image to determine the measurement comprises performing automated geometry characterization of a geometry of the ferrule chamfer based on the image.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
emitting, by one or more light sources of a microscope and when a fiber optic connector extends through a sidewall of the fiber optic connector connected to an end of the microscope, a light towards a reflective interior surface, of the fiber optic connector, to cause a silhouette of a profile of a ferrule of the fiber optic connector; and
capturing, by a camera of the microscope, an image of the silhouette of the profile of the ferrule,
wherein the image of the silhouette comprises:
a bright region corresponding to a first portion of the light reflected by the reflective interior surface, and
a shadowed region, corresponding to a second portion of the light being reflected by the reflective interior surface and obstructed more than the first portion of the light, comprising:
first portions, corresponding to an endface of the ferrule, and
a second portion, corresponding to a chamfer of the ferrule, between the first portions, and

wherein an optical axis from the camera to the ferrule is orthogonal to a mechanical axis of the ferrule, wherein the mechanical axis of the ferrule is through the sidewall of the microscope.

2. The method of claim 1,
wherein capturing the image of the silhouette of the profile of the ferrule comprises:
capturing the image of the silhouette of the profile of the ferrule based on using Kohler illumination.

3. The method of claim 1,
wherein the second portion of light is obstructed by the chamfer of the ferrule and a portion of the fiber optic connector of the ferrule.

4. The method of claim 1, wherein the reflective interior surface is beyond a plane of the ferrule.

5. The method of claim 1, wherein the reflective interior surface depends on a size and shape of the ferrule.

6. The method of claim 1, further comprising
reflecting, by a beam splitter, the first portion of the light and the second portion of the light.

7. The method of claim 1,
wherein the image depicts the ferrule as the shadowed region.

8. A microscope, comprising:
a connector adapter, at an end portion of the microscope, comprising:
a sidewall having an opening for receiving a ferrule, and
a reflective interior surface, orthogonal to the sidewall, configured to reflect a portion of light; and
a light source configured to:
emit, when the opening of the connector adapter receives the ferrule, the light towards the reflective interior surface of the connector adapter to cause a silhouette of a profile of the ferrule,
wherein the profile of the ferrule comprises a shadowed region comprising first portions, corresponding to an endface of the ferrule, and a second portion corresponding to a chamfer of the ferrule; and
a camera, configured to:
capture an image of the silhouette of the profile of the ferrule,
wherein an optical axis from the camera to the ferrule is orthogonal to a mechanical axis of the ferrule, wherein the mechanical axis of the ferrule is through the sidewall of the connector adapter.

9. The microscope of claim 8,
wherein the camera, to capture the image of the silhouette of the profile of the ferrule, is configured to:
capture the image of the silhouette of the profile of the ferrule based on using Kohler illumination.

10. The microscope of claim 8,
wherein the camera, to capture the image of the profile of the ferrule and, is configured to:
capture the image of the silhouette of the profile of the ferrule based on a first portion of the light being reflected by the reflective interior surface without obstruction and a second portion of the light being reflected by the reflective interior surface with obstruction by the chamfer of the ferrule and a portion of the connector adapter of the ferrule.

11. The microscope of claim 8,
wherein the reflective interior surface is beyond a plane of the ferrule.

12. The microscope of claim 8, wherein the reflective interior surface depends on a size and shape of the ferrule.

13. The microscope of claim 10, further comprising:

a beam splitter configured to split the light into the first portion of the light and the second portion of the light.

14. The microscope of claim 8, wherein the image depicts the ferrule as the shadowed region.

15. A system, comprising:

a microscope; and a connector adapter, connected to an end portion of the microscope-comprising a sidewall that has a first opening, for receiving a ferrule of a fiber optic connector, and a reflective interior surface orthogonal to the sidewall, wherein the microscope comprises:

a light source configured to:

emit, when the connector adapter is connected to the microscope and the opening receives the ferrule, a light onto the reflective interior surface to cause a silhouette of a profile of the ferrule, wherein the profile of the ferrule comprises a shadowed region comprising first portions, corresponding an endface of the ferrule, and a second portion corresponding to a chamfer of the ferrule; and a camera configured to:

capture an image of the silhouette of the profile of the ferrule, wherein, when the connector adapter is connected to the microscope and the opening receives the ferrule, an optical axis from the camera to the ferrule is orthogonal to a mechanical axis of the ferrule, wherein the mechanical axis of the ferrule is through the sidewall of the microscope.

16. The system of claim 15, wherein the camera, to capture the image of the profile of the ferrule, is configured to:

capture the image of the silhouette of the profile of the ferrule based on using Kohler illumination.

17. The system of claim 15, wherein the camera, to capture the image of the silhouette of the profile of the ferrule, is configured to:

capture the image of the silhouette of the profile of the ferrule based on a first portion of the light being reflected by the reflective interior surface without obstruction and a second portion of light being reflected by the reflective interior surface with obstruction by the chamfer of the ferrule and a portion of the fiber optic connector of the ferrule.

18. The system of claim 15, wherein the reflective interior surface is beyond a plane of the ferrule.

19. The system of claim 17, wherein the reflective interior surface depends on a size and shape of the ferrule.

20. The microscope of claim 17, wherein the microscope further comprises a beam splitter configured to split the light into the first portion of the light and the second portion of the light.

\* \* \* \* \*